United States Patent
Tsai

(10) Patent No.: US 8,971,963 B2
(45) Date of Patent: Mar. 3, 2015

(54) ELECTRONIC DEVICE FOR REDUCING POWER CONSUMPTION

(71) Applicant: Nuvoton Technology Corporation, Hsinchu (TW)

(72) Inventor: Doung-Her Tsai, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 139 days.

(21) Appl. No.: 13/788,591

(22) Filed: Mar. 7, 2013

(65) Prior Publication Data

US 2013/0260680 A1    Oct. 3, 2013

(30) Foreign Application Priority Data

Apr. 2, 2012  (TW) .............................. 101111638 A

(51) Int. Cl.
*H04M 1/00* (2006.01)
*H04B 7/26* (2006.01)
*H04W 52/02* (2009.01)

(52) U.S. Cl.
CPC ............ *H04B 7/26* (2013.01); *H04W 52/0229* (2013.01); *H04W 52/0283* (2013.01); *Y02B 60/50* (2013.01)
USPC ..................... 455/562.1; 455/575.7; 455/41.1

(58) Field of Classification Search
CPC ........................................................ H04B 7/26
USPC ..................... 455/41.1, 107, 574, 127.5, 13.4
See application file for complete search history.

(56) References Cited

U.S. PATENT DOCUMENTS

| | | | | |
|---|---|---|---|---|
| 4,809,196 A | * | 2/1989 | Miller | 436/4 |
| 5,872,542 A | * | 2/1999 | Simons et al. | 343/700 MS |
| 5,999,134 A | * | 12/1999 | Dishart et al. | 343/713 |
| 6,150,974 A | * | 11/2000 | Tasaka et al. | 342/53 |
| 6,980,092 B2 | * | 12/2005 | Turnbull et al. | 340/425.5 |
| 7,109,935 B2 | * | 9/2006 | Saint Clair et al. | 343/725 |
| 7,126,541 B2 | * | 10/2006 | Mohamadi | 343/700 MS |
| 7,307,625 B2 | | 12/2007 | Kurashima et al. | |
| 7,436,393 B2 | | 10/2008 | Hong et al. | |
| 7,541,987 B2 | | 6/2009 | Kyou et al. | |
| 7,656,357 B2 | * | 2/2010 | Ishibashi et al. | 343/713 |
| 8,537,071 B2 | * | 9/2013 | Ito et al. | 343/826 |
| 8,665,235 B2 | * | 3/2014 | Tang et al. | 345/173 |
| 2009/0023391 A1 | | 1/2009 | Falck | |
| 2009/0325643 A1 | | 12/2009 | Hamadene et al. | |
| 2010/0149196 A1 | | 6/2010 | Hattori et al. | |
| 2010/0244656 A1 | * | 9/2010 | Ito et al. | 313/358 |

(Continued)

FOREIGN PATENT DOCUMENTS

| | | |
|---|---|---|
| CN | 101242447 A | 8/2008 |
| TW | 201130347 A1 | 9/2011 |

(Continued)

*Primary Examiner* — Minh D Dao
(74) *Attorney, Agent, or Firm* — Muncy, Geissler, Olds & Lowe, P.C.

(57) ABSTRACT

An electronic device includes a transparent substrate, an antenna, a first chip, and a second chip. The antenna is disposed above the transparent substrate. The first chip includes a sensor. The sensor is configured to detect whether the antenna has received a wireless signal or not. The second chip is coupled to the first chip, and operates in a power-saving mode. When the antenna receives the wireless signal, the first chip wakes up the second chip such that the second chip switches from the power-saving mode to a work mode, and the first chip transmits the wireless signal to the second chip.

20 Claims, 5 Drawing Sheets

(56) References Cited

U.S. PATENT DOCUMENTS

| | | |
|---|---|---|
| 2010/0321325 A1 | 12/2010 | Springer et al. |
| 2010/0322126 A1 | 12/2010 | Krishnaswamy et al. |
| 2011/0006824 A1 | 1/2011 | Kang et al. |
| 2011/0242045 A1 | 10/2011 | Park et al. |
| 2011/0279335 A1* | 11/2011 | Degen et al. .................. 343/705 |
| 2013/0141289 A1* | 6/2013 | Vortmeier et al. ............ 343/711 |
| 2014/0139379 A1* | 5/2014 | Bolin et al. ................... 343/702 |

FOREIGN PATENT DOCUMENTS

| | | |
|---|---|---|
| TW | M416105 U | 11/2011 |
| TW | M416405 U | 11/2011 |

* cited by examiner

ELECTRONIC DEVICE FOR REDUCING POWER CONSUMPTION

CROSS REFERENCE TO RELATED APPLICATIONS

This Application claims priority of Taiwan Patent Application No. 101111638 filed on Apr. 2, 2012, the entirety of which is incorporated by reference herein.

BACKGROUND OF THE INVENTION

1. Field of the Invention

The disclosure generally relates to an electronic device, and more particularly, relates to an electronic device for reducing power consumption.

2. Description of the Related Art

RFID (Radio Frequency Identification) is wireless communication technology which can recognize something by using a wireless signal without establishing a mechanical or optical connection.

For example, a passive RFID tag has no power supply inside, and an IC (Integrated Circuit) in the RFID tag is driven by an electromagnetic wave which is transmitted from an RFID reader to the RFID tag. If the RFID tag receives a signal with sufficient energy, the RFID tag can transmit a data signal to the RFID reader. The data signal includes an ID (Identification) code and digital data previously stored in the EEPROM (Electrically-Erasable Programmable Read-Only Memory) of the RFID tag.

BRIEF SUMMARY OF THE INVENTION

In one exemplary embodiment, the disclosure is directed to an electronic device, including: a panel, including a transparent substrate; an antenna, disposed above the transparent substrate; a first chip, including a sensor, wherein the sensor is configured to detect whether the antenna has received a wireless signal or not; and a second chip, coupled to the first chip, and operating in a power-saving mode, wherein when the antenna receives the wireless signal, the first chip wakes up the second chip such that the second chip switches from the power-saving mode to a work mode, and the first chip transmits the wireless signal to the second chip.

In another embodiment, the disclosure is directed to an electronic device for communicating with a reception device, including: a panel, including a transparent substrate; a first antenna, disposed above the transparent substrate; and a first chip, generating a signal, and transmitting the signal to the first antenna, wherein the first antenna transmits the signal to the reception device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
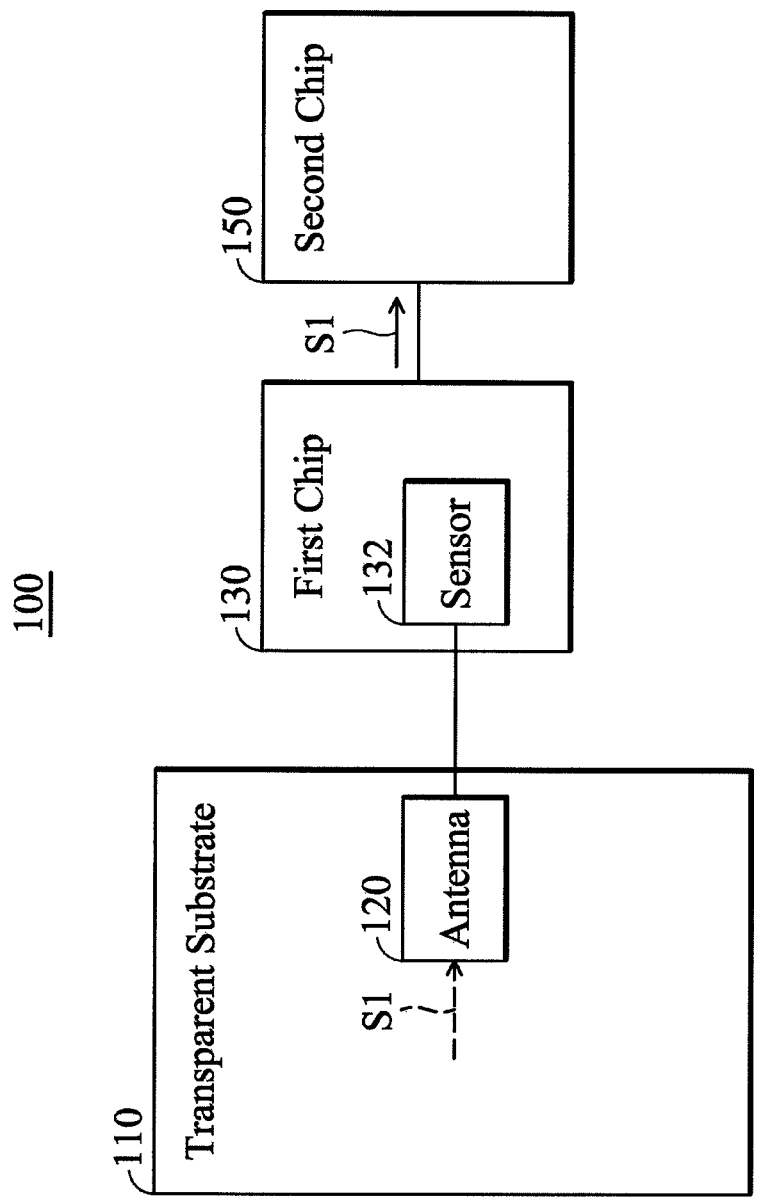
FIG. 1 is a diagram for illustrating an electronic device according to an embodiment of the invention.

FIG. 1 is a diagram for illustrating an electronic device 100 according to an embodiment of the invention. As shown in FIG. 1, the electronic device 100 includes a transparent substrate 110 of a panel, an antenna 120, a first chip 130, and a second chip 150. The electronic device 100 may be a transceiver for transmitting and receiving a wireless signal, such as a mobile phone, a tablet, or a notebook. The transceiver includes at least a communication module which can be an RF (Radio Frequency) module, a Bluetooth module, a 3G module (including a CDMA module, a WCDMA module, or a TD-SCDMA module), a 4G module (including an LTE module or a WiMAX module), a Wi-Fi module, an NFC (Near Field Communication) module or a combination thereof.

In some embodiments, the panel further includes a touch panel and/or a display panel, and the transparent substrate 110 may be a carrier substrate carrying the touch panel and/or the display panel. The transparent substrate 110 may be a glass substrate or a transparent flexible circuit board. The display panel may be, for example, an LCD (Liquid Crystal Display) panel, an OLED (Organic Light-Emitting Diode) panel, or an MEMS (Micro Electro Mechanical System) panel.

The antenna 120 is disposed above the transparent substrate 110. The antenna 120 may be a loop antenna, a monopole antenna, a slot antenna, or a chip antenna. The first chip 130 includes a sensor 132. The sensor 132 is electrically coupled to the antenna 120 so as to detect whether the antenna 120 has received a wireless signal S1 or not. For example, if the sensor 132 detects a variance in current, voltage and/or impedance of the antenna 120, the sensor 132 determines that the antenna 120 is receiving the wireless signal S1. The wireless signal S1 can be an RF signal, a Bluetooth signal, a 3G signal (including a CDMA signal, a WCDMA signal, or a TD-SCDMA signal), a 4G signal (including an LTE signal or a WiMAX signal), a Wi-Fi signal, an NFC signal, a GPS (Global Positioning System) signal or a combination thereof.

The second chip 150 is electrically coupled to the first chip 130. The second chip 150 normally operates in a power-saving mode (or a sleeping mode). When the sensor 132 detects that the antenna 120 has received the wireless signal S1, the first chip 130 immediately wakes up the second chip 150 such that the second chip 150 switches from the power-saving mode to a work mode. Then, the first chip 130 further transmits the wireless signal S1 to the second chip 150 for further processing the wireless signal S1. In other embodiments, the first chip 130 or a processor therein (not shown) normally also operates in a power-saving mode. When the antenna 120 receives the wireless signal S1, the sensor 132 wakes up the first chip 130 or the processor therein such that the first chip 130 or the processor switches from the power-saving mode to a work mode.

Figure 2:
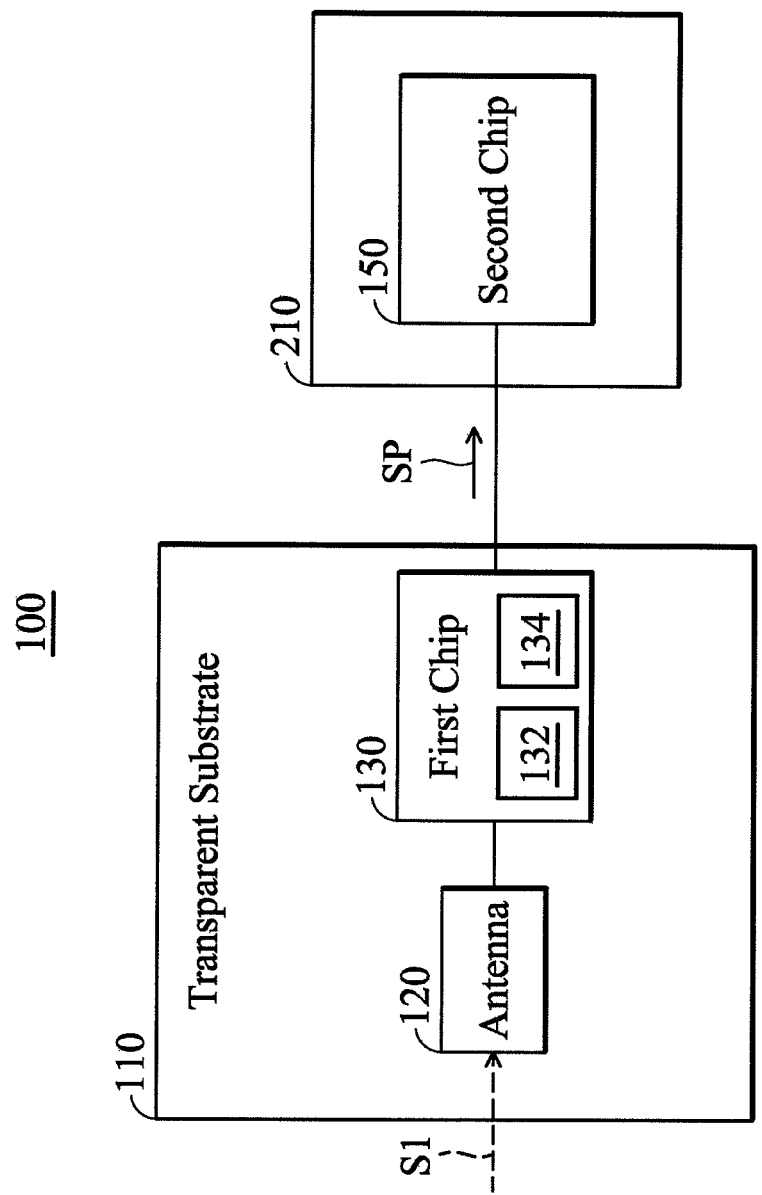
FIG. 2 is a diagram for illustrating an electronic device according to another embodiment of the invention.

FIG. 2 is a diagram for illustrating an electronic device 100 according to another embodiment of the invention. As shown in FIG. 2, the antenna 120 is disposed above the transparent substrate 110. In the embodiment, the first chip 130 may be a panel driving IC (Integrated Circuit) or a touch panel controller, and the second chip 150 may be a baseband processor. In the embodiment, the first chip 130 is also disposed above the transparent substrate 110 and further includes an NFC (Near Field Communication) control circuit 134. When the antenna 120 receives the wireless signal S1, the NFC control circuit 134 of the first chip 130 processes the wireless signal S1, and then the first chip 130 transmits the processed wireless signal S1 (i.e., the signal SP) to the second chip 150. The second chip 150 may be disposed above a main circuit board 210. In other embodiments, the first chip 130 may be disposed above an FPCB (Flexible Printed Circuit Board), and may be electrically coupled through a plurality of traces on the FPCB to the transparent substrate 110, the antenna 120, and the second chip 150, respectively.

Figure 3:
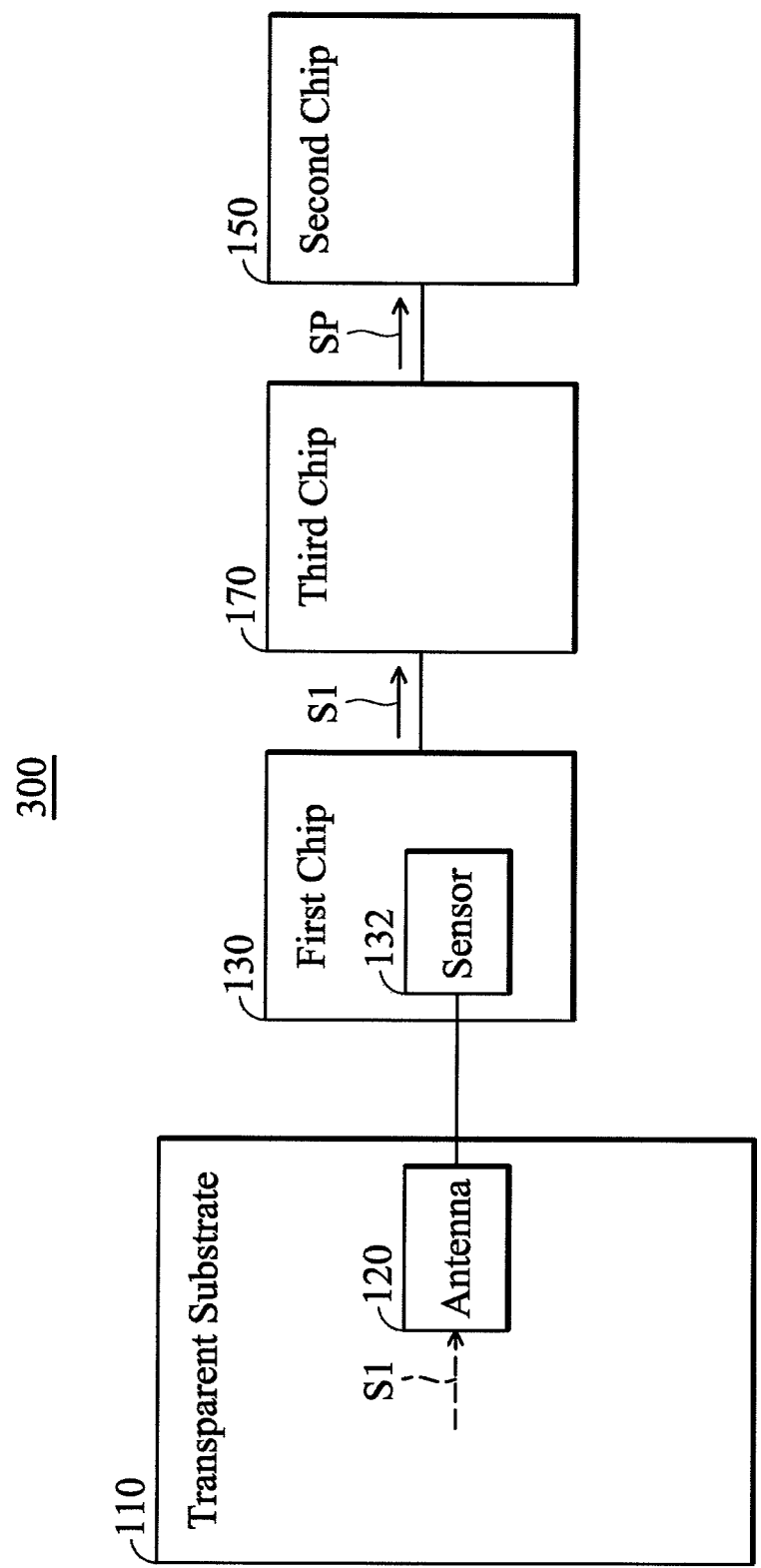
FIG. 3 is a diagram for illustrating an electronic device according to another embodiment of the invention.

FIG. 3 is a diagram for illustrating an electronic device 300 according to another embodiment of the invention. The electronic device 300 is similar to the electronic device 100 as shown in FIG. 1, but the electronic device 300 further includes a third chip 170. In some embodiments, the third chip 170 is an NFC controller, and the third chip 170 and the second chip 150 may be both disposed above a main circuit board. Similarly, the third chip 170 normally operates in a power-saving mode. When the antenna 120 receives the wireless signal S1, the first chip 130 immediately wakes up the third chip 170 and the second chip 150 such that the third chip 170 and the second chip 150 both switch from the power-saving modes to work modes.

In addition, when the antenna 120 receives the wireless signal S1, the first chip 130 can merely transmit the wireless signal S1 to the third chip 170 without processing the wireless signal S1. Next, the third chip 170 can process the wireless signal S1 and then transmit the processed wireless signal S1 (i.e., the signal SP) to the second chip 150.

In the embodiment of the invention, since the antenna 120 is disposed above the transparent substrate 110, the antenna 120 is not influenced by other electronic components so much. The wireless signal S1 is transmitted through the first chip 130 close to the transparent substrate 110 such that the signal loss is reduced. In addition, the second chip 150 and/or the third chip 170 switches from the power-saving mode to the work mode only when the antenna 120 receives the wireless signal S1, thereby reducing power consumption of the electronic device.

Figure 4:
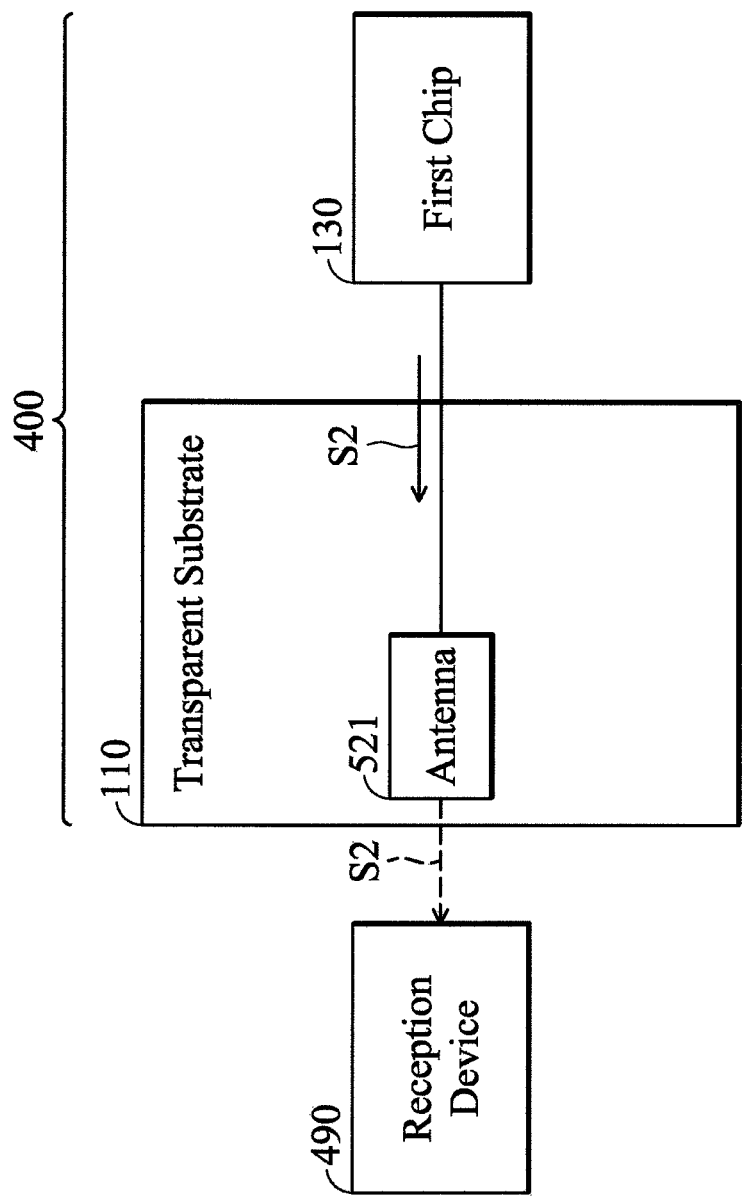
FIG. 4 is a diagram for illustrating an electronic device actively communicating with a reception device according to an embodiment of the invention.

FIG. 4 is a diagram for illustrating an electronic device 400 actively communicating with a reception device 490 according to an embodiment of the invention. As shown in FIG. 4, the electronic device 400 at least includes a transparent substrate 110, an antenna 521, and a first chip 130. The antenna 521 is disposed above the transparent substrate 110. The first chip 130 is configured to generate a signal S2. The first chip 130 further transmits the signal S2 to the antenna 521, and then the antenna 521 wirelessly transmits the signal S2 to the reception device 490. In some embodiments, the reception device 490 is a receiver for receiving wireless signals, such as a passive RFID tag. For example, the passive RFID tag may transmit a data signal back to the electronic device 400 after receiving the signal S2. In another embodiment of the invention, the antenna 521 can be a small antenna, such as a chip antenna. Note that all embodiments and features in FIGS. 1-3 of the disclosure may be applied to the electronic device 400 in FIG. 4.

Figure 5:
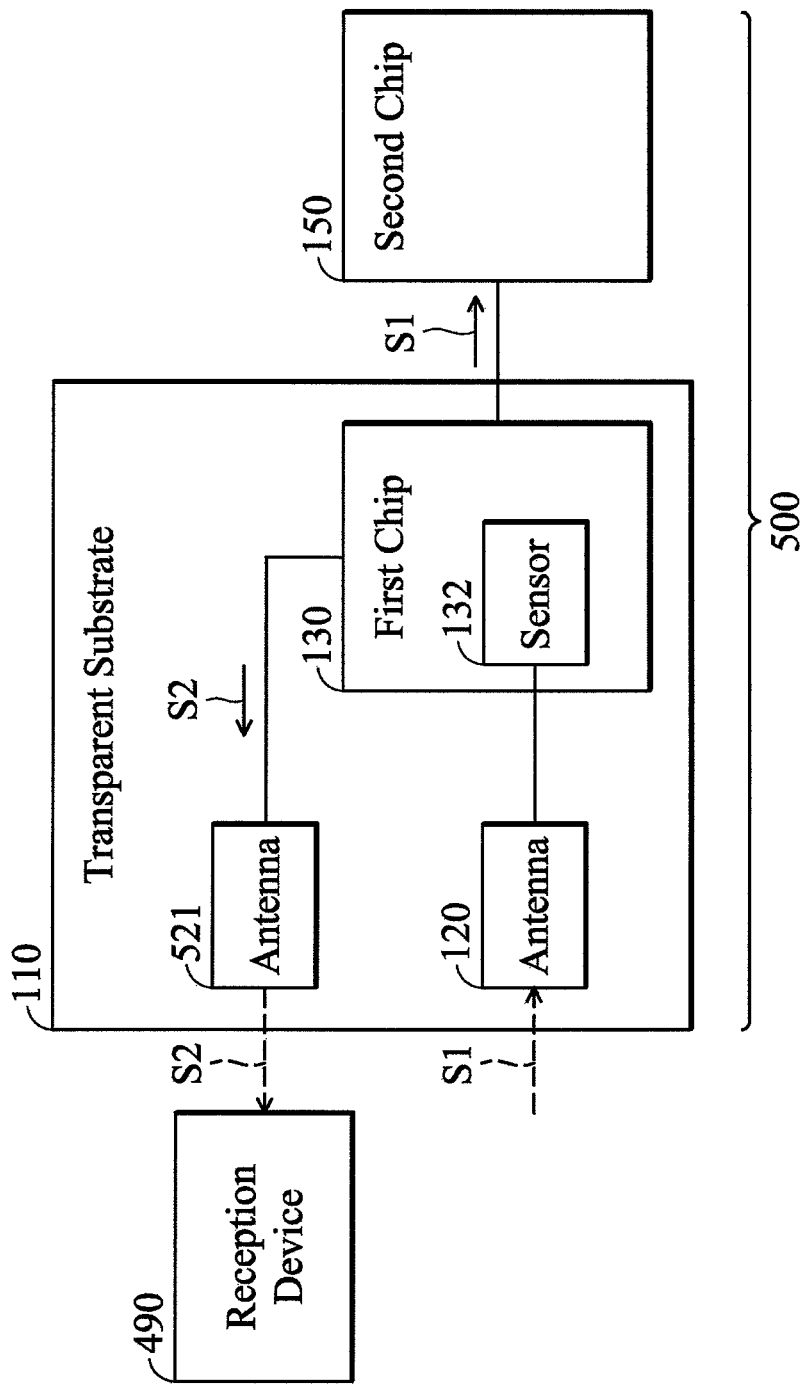
FIG. 5 is a diagram for illustrating an electronic device actively communicating with a reception device according to another embodiment of the invention.

FIG. 5 is a diagram for illustrating an electronic device 500 actively communicating with a reception device 490 according to another embodiment of the invention. The electronic device 500 is similar to the electronic device 400 as shown in FIG. 4, but the electronic device 500 further includes another antenna 120 and a second chip 150. In the embodiment, two antenna 521 and 120 and the first chip 130 are all disposed above the transparent substrate 110. Similarly, the first chip 130 includes a sensor 132 which is configured to detect whether the antenna 120 has received a wireless signal S1 or not. The second chip 150 normally operates in a power-saving mode. When the antenna 120 receives the wireless signal S1, the first chip 130 wakes up the second chip 150 such that the second chip 150 switches from the power-saving mode to a work mode, and then the first chip 130 transmits the wireless signal S1 to the second chip 150. Features of the other components have been described above. Note that all embodiments and features in FIGS. 1-4 of the disclosure may be applied to the electronic device 500 in FIG. 5.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An electronic device, including:
   a panel, including a transparent substrate;
   an antenna, disposed above the transparent substrate;
   a first chip, including a sensor, wherein the sensor is configured to detect whether the antenna has received a wireless signal or not; and
   a second chip, coupled to the first chip, and operating in a power-saving mode,
   wherein when the antenna receives the wireless signal, the first chip wakes up the second chip such that the second chip switches from the power-saving mode to a work mode, and the first chip transmits the wireless signal to the second chip.

2. The electronic device as claimed in claim 1, wherein the first chip is disposed above the transparent substrate.

3. The electronic device as claimed in claim 1, wherein the panel further includes a touch panel or a display panel.

4. The electronic device as claimed in claim 3, wherein the display panel is an LCD (Liquid Crystal Display) panel, an OLED (Organic Light-Emitting Diode) panel, or an MEMS (Micro Electro Mechanical System) panel.

5. The electronic device as claimed in claim 1, wherein the first chip is a panel driving IC (Integrated circuit).

6. The electronic device as claimed in claim 1, wherein the second chip is a baseband processor.

7. The electronic device as claimed in claim 1, wherein when the antenna receives the wireless signal, the sensor wakes up the first chip such that the first chip switches from a power-saving mode to a work mode.

8. The electronic device as claimed in claim 1, further including:
   a third chip, wherein when the antenna receives the wireless signal, the first chip transmits the wireless signal to the third chip, and the third chip processes the wireless signal and then transmits the processed wireless signal to the second chip.

9. The electronic device as claimed in claim 8, wherein the third chip is an NFC (Near Field Communication) controller.

10. The electronic device as claimed in claim 1, wherein the first chip further includes:
    an NFC (Near Field Communication) control circuit, wherein when the antenna receives the wireless signal, the NFC control circuit processes the wireless signal, and the first chip transmits the processed wireless signal to the second chip.

11. The electronic device as claimed in claim 1, wherein if the sensor detects a variance in current, voltage or impedance of the antenna, the sensor determines that the antenna has received the wireless signal.

12. An electronic device for communicating with a reception device, including:
a panel, including a transparent substrate;
a first antenna, disposed above the transparent substrate; and
a first chip, generating a signal, and transmitting the signal to the first antenna,
wherein the first antenna transmits the signal to the reception device, and
wherein the first chip is disposed above the transparent substrate.

13. The electronic device as claimed in claim 12, wherein the first antenna is a chip antenna.

14. The electronic device as claimed in claim 12, wherein the panel further includes a touch panel or a display panel.

15. The electronic device as claimed in claim 14, wherein the display panel is an LCD (Liquid Crystal Display) panel, an OLED (Organic Light-Emitting Diode) panel, or an MEMS (Micro Electro Mechanical System) panel.

16. The electronic device as claimed in claim 12, wherein the first chip is a panel driving IC (Integrated circuit).

17. The electronic device as claimed in claim 12, further including:
a second chip, coupled to the first chip, and operating in a power-saving mode; and
a second antenna, disposed above the transparent substrate,
wherein the first chip includes a sensor, and the sensor is configured to detect whether the second antenna has received a wireless signal or not.

18. The electronic device as claimed in claim 17, wherein the second chip is a baseband processor.

19. The electronic device as claimed in claim 17, wherein when the second antenna receives the wireless signal, the first chip wakes up the second chip such that the second chip switches from the power-saving mode to a work mode, and the first chip transmits the wireless signal to the second chip.

20. An electronic device for communicating with a reception device, including:
a panel, including a transparent substrate;
a first antenna, disposed above the transparent substrate;
a first chip, generating a signal, and transmitting the signal to the first antenna;
a second chip, coupled to the first chip, and operating in a power-saving mode; and
a second antenna, disposed above the transparent substrate,
wherein the first antenna transmits the signal to the reception device, and
wherein the first chip includes a sensor, and the sensor is configured to detect whether the second antenna has received a wireless signal or not.

* * * * *